US012756312B2

(12) United States Patent
Deng

(10) Patent No.: US 12,756,312 B2
(45) Date of Patent: Oct. 6, 2026

(54) BUCK CONVERTER WITH QUASI-FIXED-FREQUENCY CONSTANT ON-TIME ARCHITECTURE AND ON-TIMING CIRCUIT

(71) Applicant: SG MICRO CORP, Beijing (CN)

(72) Inventor: Yangyang Deng, Beijing (CN)

(73) Assignee: SG MICRO CORP, Beijing (CN)

( * ) Notice: Subject to any disclaimer, the term of this patent is extended or adjusted under 35 U.S.C. 154(b) by 122 days.

(21) Appl. No.: 18/879,841

(22) PCT Filed: Jun. 26, 2024

(86) PCT No.: PCT/CN2024/101552
§ 371 (c)(1),
(2) Date: Dec. 30, 2024

(87) PCT Pub. No.: WO2025/055460
PCT Pub. Date: Mar. 20, 2025

(65) Prior Publication Data

US 2026/0261207 A1 Sep. 3, 2026

(30) Foreign Application Priority Data

Sep. 12, 2023 (CN) ......................... 202311175838.X

(51) Int. Cl.
*H02M 3/158* (2006.01)

(52) U.S. Cl.
CPC .................................. *H02M 3/158* (2013.01)

(58) Field of Classification Search
CPC .................................................... H02M 3/158
See application file for complete search history.

(56) References Cited

U.S. PATENT DOCUMENTS

| | | | | |
|---|---|---|---|---|
| 10,236,774 B2 * | 3/2019 | Gritti | .................. | H02M 3/1582 |
| 10,666,144 B1 * | 5/2020 | Xie | ..................... | H02M 3/1582 |
| 11,452,184 B1 * | 9/2022 | Adragna | ............. | H02M 1/4225 |
| 2003/0231012 A1 | 12/2003 | Corva et al. | | |
| 2022/0021306 A1 * | 1/2022 | Ricci | .................. | H02M 1/0025 |

FOREIGN PATENT DOCUMENTS

| | | |
|---|---|---|
| CN | 111478581 A | 7/2020 |
| CN | 115940884 A | 4/2023 |
| CN | 117335641 A | 1/2024 |

* cited by examiner

*Primary Examiner* — Rafael O De Leon Domenech
(74) *Attorney, Agent, or Firm* — Bayramoglu Law Offices LLC

(57) ABSTRACT

An on-timing circuit includes a current generation module, an inversion delay counteracting module, a capacitor, and a comparator, wherein the current generation module is configured to generate a charging current in direct proportion to a voltage of a switch node after an upper power transistor is turned on; the inversion delay counteracting module is configured to generate a first delay for counteracting an inversion delay of the comparator according to a variable resistance unit and the capacitor, and a resistance value of the variable resistance unit is controlled by an input voltage; the capacitor is configured to be charged by the charging current after the upper power transistor is turned on; and the comparator is configured to compare a ramp voltage corresponding to a ramp voltage node with a first voltage and generate a turn-off signal, and the first voltage is a reference voltage in proportion to an output voltage.

12 Claims, 5 Drawing Sheets

BUCK CONVERTER WITH QUASI-FIXED-FREQUENCY CONSTANT ON-TIME ARCHITECTURE AND ON-TIMING CIRCUIT

CROSS-REFERENCE TO THE RELATED APPLICATIONS

This application is the national phase entry of International Application No. PCT/CN2024/101552, filed on Jun. 26, 2024, which is based upon and claims priority to Chinese Patent Application No. 202311175838.X, filed on Sep. 12, 2023, the entire contents of which are incorporated herein by reference.

TECHNICAL FIELD

Embodiments of the present disclosure relate to the technical field of integrated circuits, and in particular to a buck converter with a quasi-fixed-frequency constant on-time architecture and an on-timing circuit.

BACKGROUND

In a buck converter with a quasi-fixed-frequency constant on-time architecture, on-timing $t_{on}$ is usually in direct proportion to an output voltage Vo and in inverse proportion to an input voltage Vi. As shown in FIG. 1, which is a schematic diagram of a circuit structure of a commonly used on-timing circuit in a buck converter with a quasi-fixed-frequency constant on-time architecture, where a negative input end of a comparator is coupled to the output voltage, a positive input end is coupled to a voltage of a capacitor Con, and a charging current Ion is a ratio of the input voltage to Ron. According to the voltage-current relationship of the capacitor, (Vi/Ron)×Ton=Con×Vo may be obtained. Theoretically, an on-time of an upper power transistor Ton=(Con×Vo×Ron)/Vi is obtained. From the expression of Ton, it may be seen that Ton is in direct proportion to Vo and in inverse proportion to Vi. But in fact, the calculation of Ton also needs to add an inversion delay Tcomp of the comparator comp. The inversion delay of the comparator may change with the voltage of Vi, and Tcomp may affect the linearity of Ton following the changes of Vi and Vo, especially when Vi and Vo change in a wide range. If Vi is very high and Vo is very small, that is, when a duty cycle is small, Ton may reach tens of ns, and the inversion delay of the comparator is also tens of ns. If Vi is very low, Vo and Vi are relatively close, that is, when the duty cycle is large, the inversion delay of the comparator may reach hundreds of ns. The larger the inversion delay of the comparator accounts for the actual on-timing, the more serious the nonlinearity of Ton is, so as to cause the operating frequency of the entire buck converter system with the quasi-fixed-frequency constant on-time architecture to change greatly at full voltage, which is not conducive to peripheral applications. Therefore, on-timing is performed according to the on-timing circuit in FIG. 1, which may cause the operating frequency of the entire buck converter system with the quasi-fixed-frequency constant on-time architecture to change greatly at full voltage.

In addition, according to the volt-second balance principle of the buck converter, the following equation is obtained in practical application.

$$(V_i - I_{load} \cdot R_{hs} - V_o) \cdot T_{on} = V_o \cdot T_{off}.$$

Where $I_{load}$ is an output load current, $R_{hs}$ is an on-resistance of the upper power transistor, and $T_{off}$ is a turn-off time of the upper power transistor. The above equation is transformed to obtain:

$$(V_i - I_{load} \cdot R_{hs}) \cdot T_{on} = V_o \cdot T_{off} + V_o \cdot T_{on} = V_o \cdot T_s,$$

$$T_{on} = \frac{V_o}{V_i - I_{load} \cdot R_{hs}} \times T_s.$$

It may be seen that if the $I_{load}$ changes greatly, the change of an on-loss $I_{load} \times R_{hs}$ of the upper power transistor cannot be ignored, that is, at this time, Ton is not in inverse proportion to the input voltage Vi, but in inverse proportion to $(Vi - I_{load} \times R_{hs})$. However, Ton obtained by the on-timing circuit in FIG. 1 is still in inverse proportion to Vi, and the influence of $I_{load}$ on Ton is not considered. Therefore, the actual Ton may also change greatly when $I_{load}$ changes greatly, resulting in a large change in the operating frequency.

In summary, the problem of a large change in the operating frequency in the buck converter with the quasi-fixed-frequency constant on-time architecture needs to be solved urgently.

SUMMARY

Embodiments described herein provide a buck converter with a quasi-fixed-frequency constant on-time architecture and an on-timing circuit to solve the problem of a large change in the operating frequency in the buck converter with the quasi-fixed-frequency constant on-time architecture.

According to a first aspect of the present disclosure, an on-timing circuit is provided, which is configured for a buck converter with a quasi-fixed-frequency constant on-time architecture, and can output a turn-off signal for turning off an upper power transistor of the buck converter. The on-timing circuit includes a current generation module, an inversion delay counteracting module, a capacitor, and a comparator. An input end of the current generation module is coupled to a switch node of the buck converter, an output end of the current generation module is coupled to a ramp voltage node, the switch node is a node where the upper power transistor in the buck converter and an inductor are coupled, and the current generation module is configured to generate a charging current in direct proportion to a voltage of the switch node after the upper power transistor is turned on. An input end of the inversion delay counteracting module is coupled to the ramp voltage node, an output end of the inversion delay counteracting module is coupled to one end of the capacitor, the inversion delay counteracting module is configured to generate a first delay for counteracting an inversion delay of the comparator according to a variable resistance unit and the capacitor, and a resistance value of the variable resistance unit is controlled by an input voltage of the buck converter. The other end of the capacitor is coupled to a ground terminal, and the capacitor is configured to be charged by the charging current after the upper power transistor is turned on. A positive input end of the comparator is coupled to the ramp voltage node, a negative input end of the comparator is coupled to a first voltage, the comparator is configured to compare a ramp voltage corresponding to the ramp voltage node with the first voltage and generate the turn-off signal, and the first voltage is a reference voltage in proportion to an output voltage of the buck converter.

Optionally, the current generation module includes a first current generation module and a second current generation module. The first current generation module is configured to generate a first current according to the voltage of the switch node and the voltage of the ramp voltage node. The second current generation module is configured to generate a second current according to the voltage of the ramp voltage node, and the sum of the first current and the second current is the charging current.

Optionally, the inversion delay counteracting module includes a decoder unit and the variable resistance unit. The decoder unit is configured to generate a switch control signal according to the input voltage. The variable resistance unit is configured to adjust the resistance value of the variable resistance unit according to the switch control signal.

Optionally, the first current generation module includes a first resistor and a first switch. One end of the first resistor is coupled to the switch node, the other end of the first resistor is coupled to one end of the first switch, and the other end of the first resistor generates the first current. The other end of the first switch is coupled to the ramp voltage node, and the first switch is closed after the upper power transistor is turned on, and is disconnected after the upper power transistor is turned off.

Optionally, the second current generation module includes first to sixth transistors, a first current source, and a second resistor. The first transistor and the second transistor form a first current mirror, a source of the first transistor and a source of the second transistor are both coupled to a power supply voltage, a gate of the first transistor and a gate of the second transistor are both coupled to a drain of the first transistor, a drain of the second transistor is coupled to the ramp voltage node, and a drain of the second transistor generates the second current. The third transistor and the fourth transistor form a second current mirror, a gate of the third transistor and a gate of the fourth transistor are both coupled to a drain of the third transistor, the drain of the third transistor is coupled to one end of the first current source, and a drain of the fourth transistor is coupled to the drain of the first transistor. A source of the fifth transistor is coupled to a source of the third transistor, a gate of the fifth transistor is coupled to the ramp voltage node, and a drain of the fifth transistor is coupled to the ground terminal. A source of the sixth transistor is coupled to a source of the fourth transistor, a gate of the sixth transistor is coupled to a drain of the sixth transistor, and the drain of the sixth transistor is coupled to one end of the second resistor. The other end of the second resistor is coupled to the ground terminal, and the other end of the first current source is coupled to the power supply voltage.

Optionally, the variable resistance unit includes n resistors and n switches. The n resistors are sequentially connected in series, and both sides of each resistor are connected to one switch in parallel.

Optionally, the decoder unit includes an n-bit decoder, and the switch control signal includes n switch signals. An input end of the n-bit decoder receives the input voltage, an output end of the n-bit decoder outputs the n switch signals, the n switch signals control the opening and closing of the n switches, and each switch corresponds to one switch signal.

Optionally, the resistance value of the variable resistance unit is in inverse proportion to the input voltage.

Optionally, a resistance value of the first resistor is equal to a resistance value of the second resistor.

Optionally, the on-timing circuit further includes a second switch. The second switch is coupled between the ramp voltage node and the ground terminal, and the second switch is disconnected after the first switch is closed, and is closed after the first switch is disconnected.

Optionally, current mirror ratios of the first current mirror and the second current mirror are both 1.

According to a second aspect of the present disclosure, a buck converter with a quasi-fixed-frequency constant on-time architecture is provided, including the on-timing circuit of any one in the first aspect.

In the on-timing circuit of the embodiments of the present disclosure, the inversion delay of the comparator is counteracted by the first delay generated by the inversion delay counteracting module, thereby eliminating the influence of the inversion delay of the comparator on the on-time Ton; and in addition, when the upper power transistor is turned on, the voltage of the switch node is the input voltage minus the on-loss of the upper power transistor ($Vi-I_{load}\times R_{hs}$), so that the current generation module generates the charging current in direct proportion to the voltage of the switch node to charge the capacitor, and the on-time may be in inverse proportion to the voltage of the switch node, that is, the on-time is in inverse proportion to ($Vi-I_{load}\times R_{hs}$), and compared with the existing on-timing circuit, the influence of the load current on Ton is considered. In summary, compared with the existing on-timing circuit, the on-timing circuit of the embodiments of the present disclosure can also ensure a relatively small change in the system operating frequency under a wide range of input voltages and output voltages, and different loads, and better meet the requirements of peripheral applications.

BRIEF DESCRIPTION OF THE DRAWINGS

In order to more clearly illustrate the technical solutions in the embodiments of the present disclosure more clearly, the drawings of the embodiments will be briefly described below. It is to be known that the drawings described below show merely some embodiments of the present disclosure, rather than limiting the present disclosure.

Figure 1:
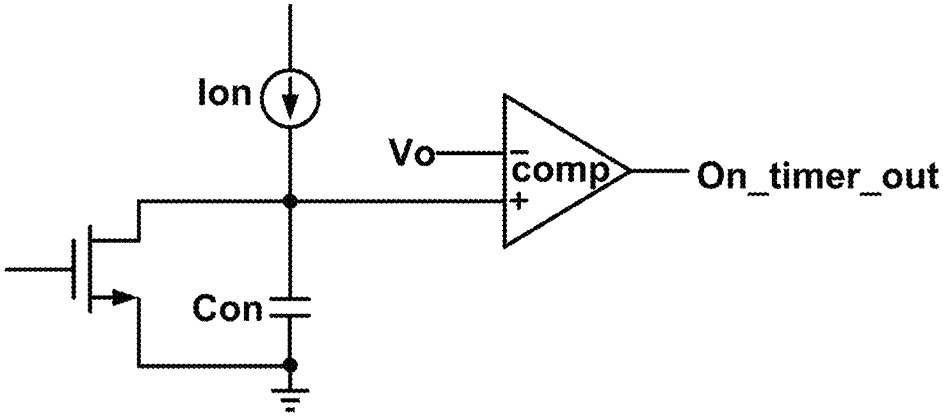
FIG. 1 shows a schematic block diagram of an existing on-timing circuit.

Elements in the drawings are schematic and not drawn to scale.

DETAILED DESCRIPTION OF THE EMBODIMENTS

In order to make the purpose, technical solutions, and advantages of the embodiments of the present disclosure clearer, the technical solutions in the embodiments of the present disclosure will be described clearly and completely below with reference to the drawings. It is apparent that the described embodiments are part rather than all embodiments of the present disclosure. On the basis of the description of the embodiments of the present disclosure, all other embodiments obtained by those skilled in the art without creative work shall fall within the scope of protection of the present disclosure.

Unless otherwise defined, all terms used herein (including technical and scientific terms) have the same meanings as those commonly understood by those skilled in the art that the subject of the present disclosure belongs. Further, it is to be understood that terms such as those defined in commonly used dictionaries should be interpreted as having the meanings consistent with those in the context of the specification and related technologies, and will not be interpreted in an idealized or overly formal form, unless otherwise defined herein. As used herein, the statement that two or more parts are "connected" or "coupled" together shall mean that these parts are combined directly or through one or more intermediate parts. In addition, terms such as "first" and "second" are only used for distinguishing one component (or one part of a component) from another component (or another part of a component).

In order to solve the problem that the existing on-timing circuit may cause a large change in the operating frequency in a buck converter with a quasi-fixed-frequency constant on-time architecture under a wide range of input voltages and output voltages, and different loads, a new on-timing circuit structure is proposed. According to the on-timing circuit in the embodiments of the present disclosure, an on-time is in direct proportion to the output voltage and in inverse proportion to a voltage of a switch node, so that the frequency change caused by a change in an on-loss of a power transistor may be weakened; and in addition, a delay that changes with the input voltage is added to the circuit to counteract an inversion delay of a comparator that changes with the input voltage, and finally a timing circuit that linearly follows the changes in the voltage of the switch node and the output voltage is obtained, so as to achieve a relatively small change in the system operating frequency under a wide range of Vi and Vo, and different loads, and better meet the requirements of peripheral applications. The on-timing circuit of the present disclosure will be described in detail below.

Figure 2:
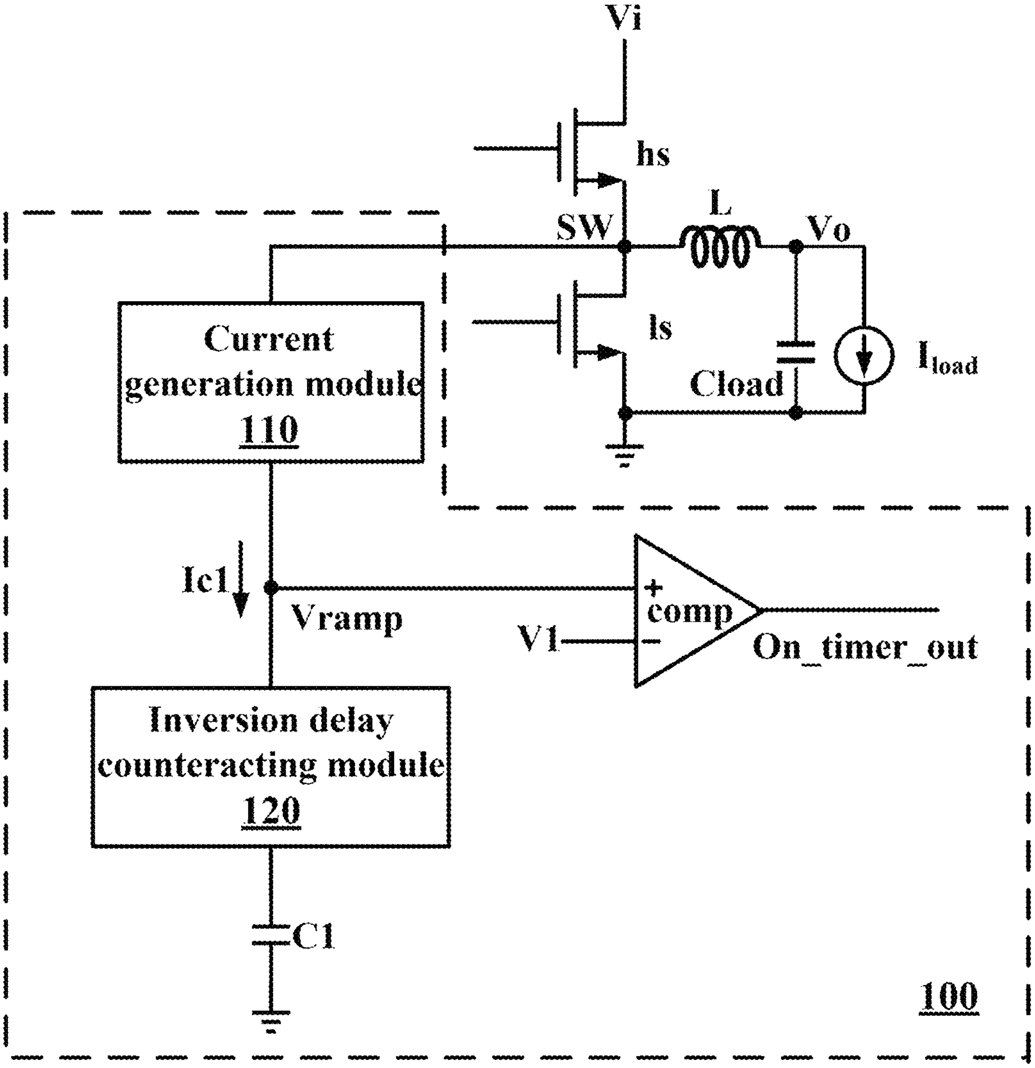
FIG. 2 shows a schematic block diagram of an on-timing circuit according to an embodiment of the present disclosure.

FIG. 2 shows a schematic block diagram of an on-timing circuit 100 according to an embodiment of the present disclosure. The on-timing circuit 100 is configured for a buck converter with a quasi-fixed-frequency constant on-time architecture, and can output a turn-off signal On_timer_out for turning off an upper power transistor of the buck converter. It is to be noted that FIG. 2 also shows other structures of the buck converter (which may be a Buck converter), including an upper power transistor hs, a lower power transistor ls, an inductor L, an output capacitor Cload, and a load current $I_{load}$. As shown in FIG. 2, the on-timing circuit 100 includes a current generation module 110, an inversion delay counteracting module 120, a capacitor C1, and a comparator comp.

An input end of the current generation module 110 is coupled to a switch node SW of the buck converter, an output end of the current generation module 110 is coupled to a ramp voltage node Vramp, the switch node SW is a node where the upper power transistor hs in the buck converter and the inductor L are coupled, and the current generation module 110 is configured to generate a charging current Ic1 in direct proportion to a voltage of the switch node SW after the upper power transistor hs is turned on. The charging current Ic1 is for charging the capacitor C1. The function of the charging current Ic1 is the same as that of Ion in FIG. 1, both of which are for charging the capacitor. Since when the upper power transistor hs is turned on, the voltage $V_{SW}$ of the switch node SW is an input voltage Vi minus an on-loss of the upper power transistor hs, that is, $V_{SW}=Vi-I_{load}\times R_{hs}$, where $I_{load}$ is the load current, and $R_{hs}$ is an on-resistance of the upper power transistor. Therefore, the current generation module 110 generates the charging current Ic1 in direct proportion to the voltage of the switch node SW to charge the capacitor C1, and an on-time Ton may be in inverse proportion to the voltage $V_{SW}$ of the switch node SW, that is, the on-time Ton is in inverse proportion to $(Vi-I_{load}\times R_{hs})$. Therefore, compared with the existing on-timing circuit, the embodiment of the present disclosure considers the influence of the load current on the on-time Ton.

An input end of the inversion delay counteracting module 120 is coupled to the ramp voltage node Vramp, an output end of the inversion delay counteracting module 120 is coupled to one end of the capacitor C1, the inversion delay counteracting module 120 is configured to generate a first delay for counteracting an inversion delay of the comparator comp according to a variable resistance unit 122 (shown in FIG. 3) and the capacitor C1, and a resistance value of the variable resistance unit 122 is controlled by the input voltage Vi of the buck converter. The first delay is generated to eliminate the influence of the inversion delay of the comparator comp on the on-time Ton.

The other end of the capacitor C1 is coupled to a ground terminal, and the capacitor C1 is configured to be charged by the charging current Ic1 after the upper power transistor hs is turned on.

A positive input end of the comparator comp is coupled to the ramp voltage node Vramp, a negative input end of the comparator comp is coupled to a first voltage V1, the comparator comp is configured to compare a ramp voltage $V_{ramp}$ corresponding to the ramp voltage node Vramp with the first voltage V1 and generate the turn-off signal On_timer_out, and the first voltage V1 is a reference voltage in proportion to an output voltage Vo of the buck converter. Specifically, when the ramp voltage $V_{ramp}$ is greater than the first voltage V1, the turn-off signal On_timer_out is generated, so that a logic control unit in the buck converter controls the turn-off of the upper power transistor hs according to the turn-off signal On_timer_out. The first voltage V1 is set to be in proportion to the output voltage Vo to ensure that the on-time Ton is in direct proportion to the output voltage Vo.

In the on-timing circuit of the embodiments of the present disclosure, the inversion delay of the comparator comp is counteracted by the first delay generated by the inversion delay counteracting module 120, thereby eliminating the influence of the inversion delay of the comparator comp on the on-time Ton; and in addition, when the upper power transistor hs is turned on, the voltage of the switch node SW is the input voltage Vi minus the on-loss of the upper power transistor hs $(Vi-I_{load}\times R_{hs})$, so that the current generation module 110 generates the charging current Ic1 in direct proportion to the voltage of the switch node SW to charge the capacitor C1, and the on-time may be in inverse proportion to the voltage of the switch node SW, that is, the on-time is in inverse proportion to $(Vi-I_{load}\times R_{hs})$, and compared with the existing on-timing circuit, the influence of the load current on Ton is considered. The finally obtained on-time is in direct proportion to the voltage of the switch node SW and in inverse proportion to the output voltage Vo. Compared with the existing on-timing circuit, the on-timing circuit of the embodiments of the present disclosure eliminates the influence of the inversion delay of the comparator comp and the load current change on the on-time, so that the on-timing circuit can also ensure a relatively small change in the system operating frequency under a wide range of input voltage Vi and output voltage Vo, and different loads, and better meet the requirements of peripheral applications.

Figure 3:
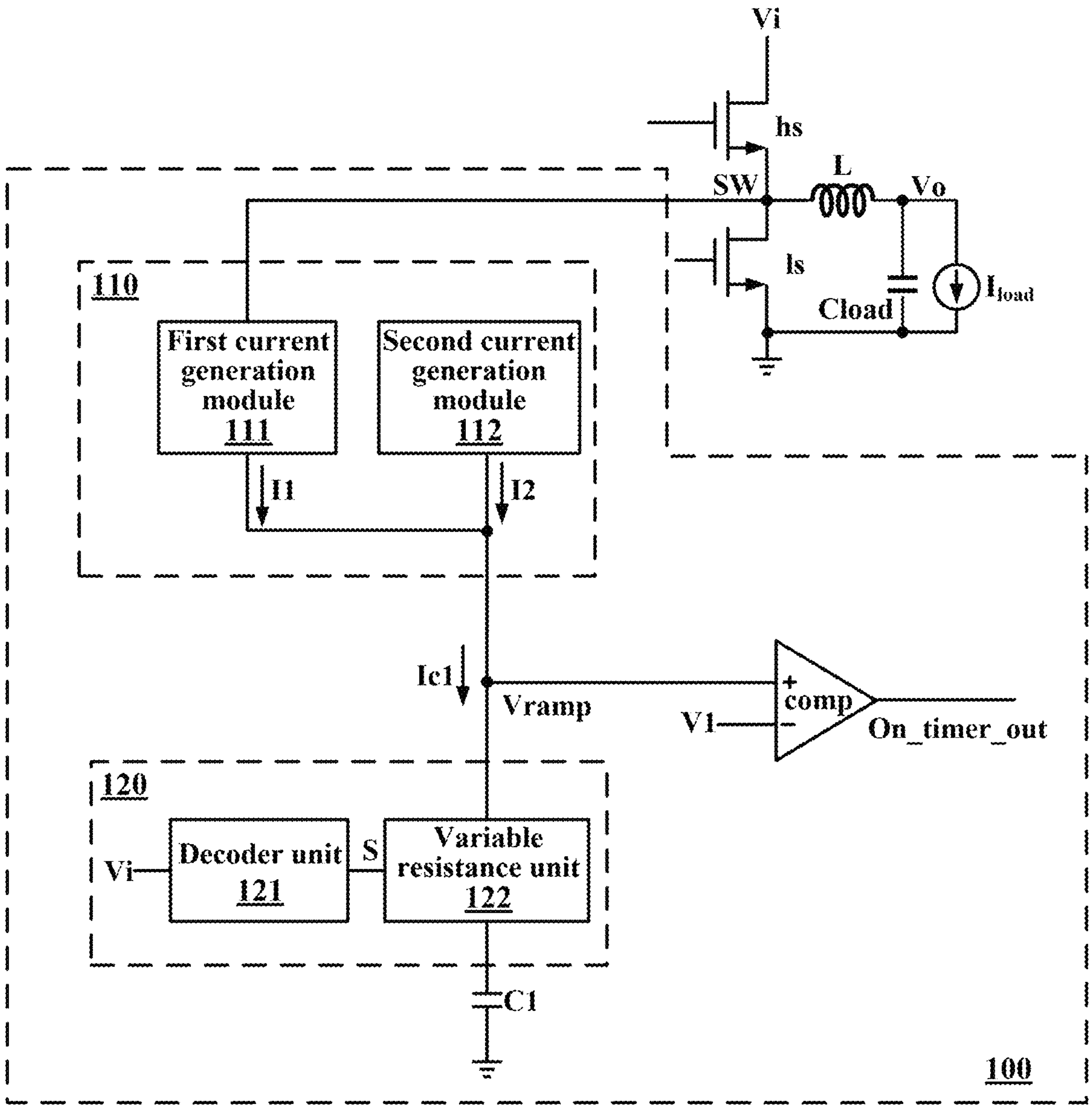
FIG. 3 shows a schematic circuit diagram of another on-timing circuit according to an embodiment of the present disclosure.

Further, as shown in FIG. 3, the current generation module 110 includes a first current generation module 111 and a second current generation module 112. The first current generation module 111 is configured to generate a first current I1 according to the voltage $V_{SW}$ of the switch node SW and the voltage of the ramp voltage node Vramp. The second current generation module 112 is configured to generate a second current I2 according to the voltage of the ramp voltage node Vramp, and the sum of the first current I1 and the second current I2 is the charging current Ic1.

Figure 4:
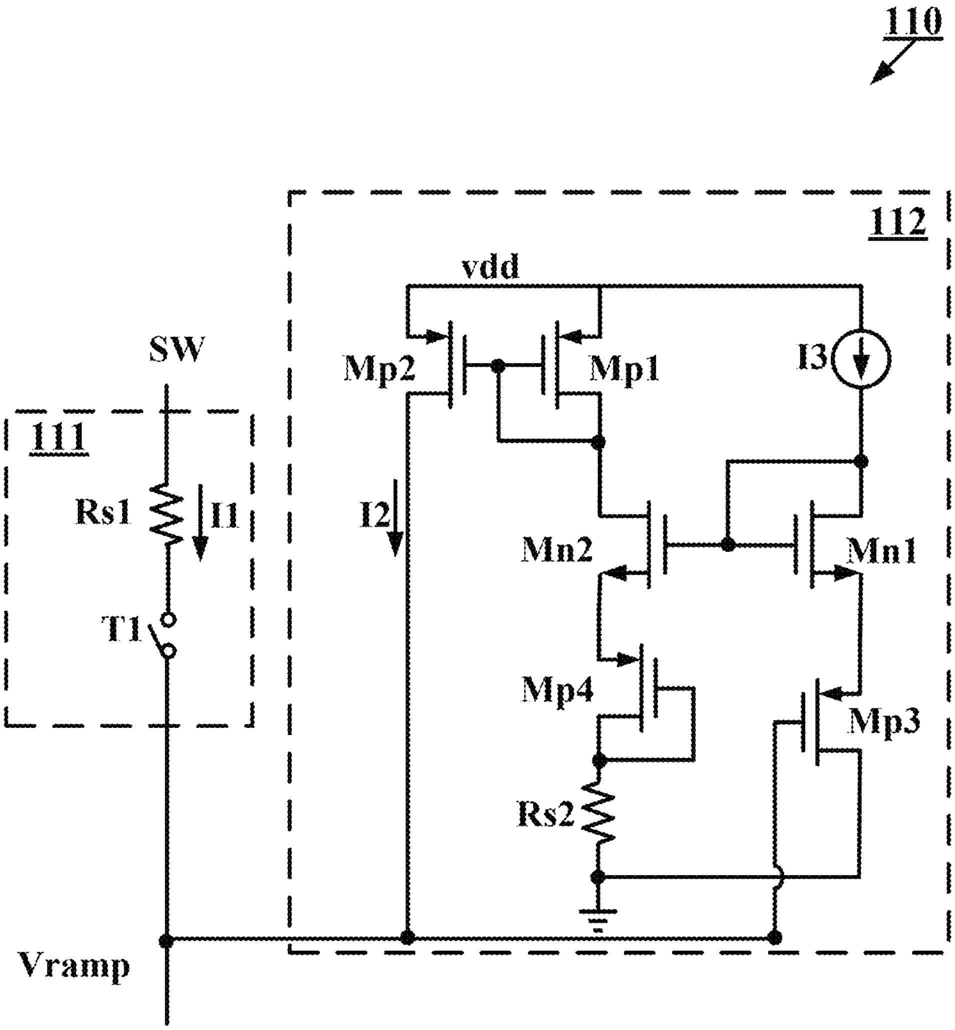
FIG. 4 shows an exemplary circuit diagram of a current generation module in an on-timing circuit according to an embodiment of the present disclosure.

Specifically, as shown in FIG. 4, the first current generation module 111 includes a first resistor Rs1 and a first switch T1. One end of the first resistor Rs1 is coupled to the switch node SW, the other end of the first resistor Rs1 is coupled to one end of the first switch T1, and the other end of the first resistor Rs1 generates the first current I1. The other end of the first switch T1 is coupled to the ramp voltage node Vramp, and the first switch T1 is closed after the upper power transistor hs is turned on, and is disconnected after the upper power transistor hs is turned off.

As shown in FIG. 4, the second current generation module 112 includes first to sixth transistors, a first current source I3, and a second resistor Rs2. The first transistor Mp1 and the second transistor Mp2 form a first current mirror, a source of the first transistor Mp1 and a source of the second transistor Mp2 are both coupled to a power supply voltage vdd, a gate of the first transistor Mp1 and a gate of the second transistor Mp2 are both coupled to a drain of the first transistor Mp1, a drain of the second transistor Mp2 is coupled to the ramp voltage node Vramp, and a drain of the second transistor Mp2 generates the second current I2. The third transistor Mn1 and the fourth transistor Mn2 form a second current mirror, a gate of the third transistor Mn1 and a gate of the fourth transistor Mn2 are both coupled to a drain of the third transistor Mn1, the drain of the third transistor Mn1 is coupled to one end of the first current source I3, and a drain of the fourth transistor Mn2 is coupled to the drain of the first transistor Mp1. A source of the fifth transistor Mp3 is coupled to a source of the third transistor Mn1, a gate of the fifth transistor Mp3 is coupled to the ramp voltage node Vramp, and a drain of the fifth transistor Mp3 is coupled to the ground terminal. A source of the sixth transistor Mp4 is coupled to a source of the fourth transistor Mn2, a gate of the sixth transistor Mp4 is coupled to a drain of the sixth transistor Mp4, and the drain of the sixth transistor Mp4 is coupled to one end of the second resistor Rs2. The other end of the second resistor Rs2 is coupled to the ground terminal, and the other end of the first current source I3 is coupled to the power supply voltage vdd. It is to be noted that a resistance value of the first resistor Rs1 is equal to a resistance value of the second resistor Rs2, current mirror ratios of the first current mirror and the second current mirror are both 1, and the fifth transistor Mp3 and the sixth transistor Mp4 are also the same transistors. In addition, the first transistor Mp1, the second transistor Mp2, the fifth transistor Mp3, and the sixth transistor Mp4 may be P-type Metal Oxide Semiconductor (MOS) transistors, and the third transistor Mn1 and the fourth transistor Mn2 may be N-type MOS transistors.

Further, as shown in FIG. 3, the inversion delay counteracting module 120 includes a decoder unit 121 and the variable resistance unit 122. The decoder unit 121 is configured to generate a switch control signal S according to the input voltage Vi. The variable resistance unit 122 is configured to adjust the resistance value of the variable resistance unit 122 according to the switch control signal S.

Figure 5:
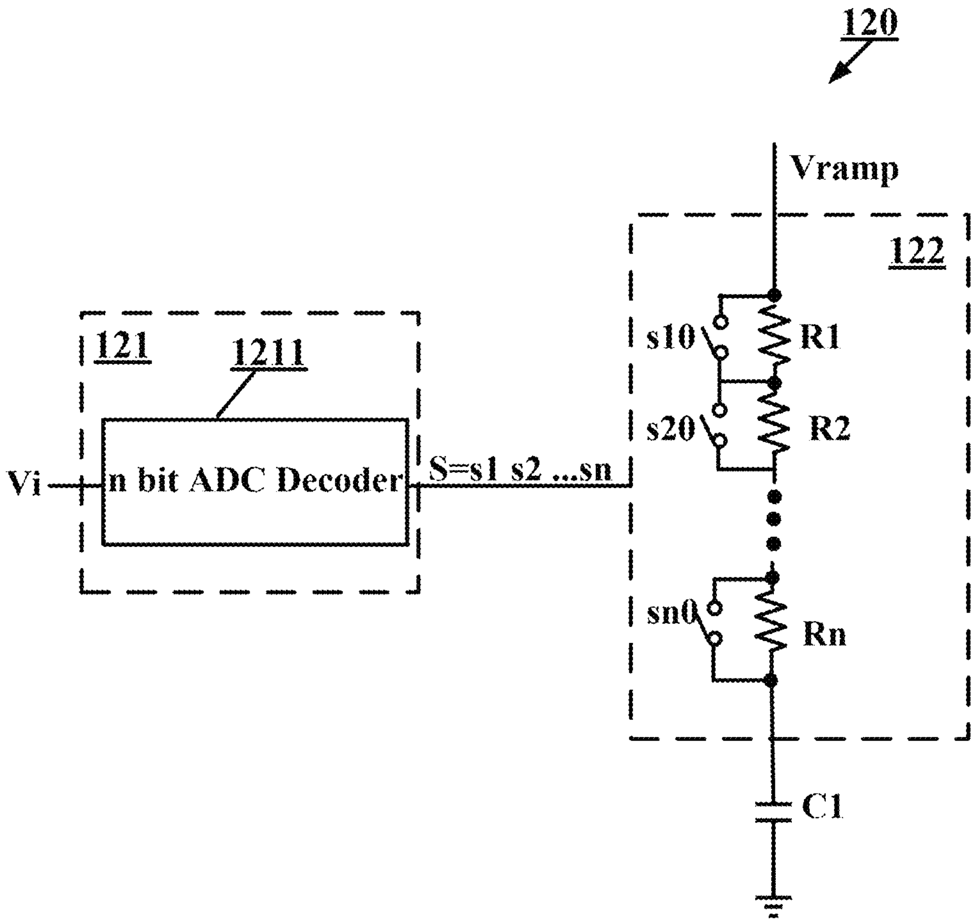
FIG. 5 shows an exemplary circuit diagram of an inversion delay counteracting module in an on-timing circuit according to an embodiment of the present disclosure.

Specifically, as shown in FIG. 5, the variable resistance unit 122 includes n resistors (R1, R2, . . . , Rn) and n switches (s10, s20, . . . , sn0). The n resistors are sequentially connected in series, and both sides of each resistor are connected to one switch in parallel. The decoder unit 121 includes an n-bit decoder 1211, and the switch control signal S includes n switch signals (s1, s2, . . . , sn). An input end of the n-bit decoder 1211 receives the input voltage Vi, an output end of the n-bit decoder 1211 outputs the n switch signals (s1, s2, . . . , sn), the n switch signals (s1, s2, . . . , sn) control the opening and closing of the n switches (s10, s20, . . . , sn0), and each switch corresponds to one switch signal, specifically, s1 controls s10, s2 controls s20, and so on, sn controls sn0. The resistance value $R_S$ of the variable resistance unit 122 is in inverse proportion to the input voltage Vi. That is, the larger Vi is, the smaller $R_S$ is, and the smaller Vi is, the larger $R_S$ is.

The principle of the on-timing circuit in the embodiments of the present disclosure is analyzed in conjunction with FIG. 3 to FIG. 5. When the upper power transistor hs is turned on, the first switch T1 is closed, and the first current I1 may be obtained according to the circuit structure in FIG. 4.

$$I1 = \frac{V_{SW} - V_{ramp}}{Rs1}. \tag{1}$$

According to the circuit structure in FIG. 4, the following may also be obtained.

$$V_{ramp}+V_{Mp3}+V_{Mn1}=V_{Rs2}+V_{Mp4}+V_{Mn2} \tag{2}$$

Where $V_{Mn1}$, $V_{Mn2}$, $V_{mp3}$, and $V_{Mp4}$ are the voltages of the third transistor Mn1, the fourth transistor Mn2, the fifth transistor Mp3, and the sixth transistor Mp4 respectively, and $V_{Rs2}$ is the voltage of the second resistor.

Since the current mirror ratios of the first current mirror and the second current mirror are both 1, and the fifth transistor Mp3 and the sixth transistor Mp4 are the same transistors, the following may be obtained.

$$V_{Mp3}=V_{Mp4} \text{、} V_{Mn1}=V_{Mn2} \tag{3}$$

The two equations in the formula (3) are substituted into the formula (2) to obtain:

$$V_{ramp}=V_{Rs2} \tag{4}$$

Therefore, the second current I2 may be obtained.

$$I2 = I_{MP1} = V_{Rs2}/Rs2 = V_{ramp}/Rs2 \tag{5}$$

Since Rs1=Rs2, the charging current Ic1 is obtained according to the formulas (1) and (5).

$$Ic1 = I1 + I2 = \frac{V_{SW}}{Rs1} = \frac{Vi - I_{load} \times R_{hs}}{Rs1}. \tag{6}$$

Where when the upper power transistor hs is turned on, according to the circuit diagram of FIG. 3, it may be known that the voltage $V_{SW}$ of the switch node SW is equal to $Vi-I_{load}\times R_{hs}$, where $I_{load}$ is the load current and $R_{hs}$ is the on-resistance of the upper power transistor hs.

According to the circuit diagrams of FIG. 3 to FIG. 5, it may be obtained that the following formula is satisfied at the end of the on-timing.

$$\frac{V_{SW}}{Rs1}\times R_S+V_{c1}=V1. \tag{7}$$

Where $R_S$ is an equivalent resistance value of the variable resistance unit 122, $V_{c1}$ is the voltage across the capacitor C1, and according to the relationship between the current and voltage of the capacitor, the following may be obtained.

$$V_{c1}=\frac{V_{SW}}{Rs1}\times \text{Ton}\div C1. \tag{8}$$

The following may be obtained by substituting the formula (8) into the formula (7).

$$\frac{V_{SW}}{Rs1}\times R_S+\frac{V_{SW}}{Rs1}\times \text{Ton}\div C1=V1. \tag{9}$$

The following may be obtained by transforming the formula (9).

$$\text{Ton}=\frac{V1\cdot Rs1\cdot C1}{V_{SW}}-R_S\cdot C1=\frac{V1\cdot Rs1\cdot C1}{Vi-I_{load}\cdot R_{hs}}-R_S\cdot C1. \tag{10}$$

The actual on-time also needs to add the inversion delay Tcomp of the comparator, so that the formula (10) becomes:

$$\text{Ton}=\frac{V1\cdot Rs1\cdot C1}{Vi-I_{load}\cdot R_{hs}}-R_S\cdot C1+Tcomp. \tag{11}$$

In the formula, Tcomp changes with Vi, and $R_S$·C1 also changes with Vi. If the two are equal, that is, $R_S$·C1=Tcomp, the influence of Tcomp on Ton may be counteracted, and then assuming that V1=k·Vo, the formula (11) becomes:

$$\text{Ton}=\frac{k\cdot Vo\cdot Rs1\cdot C1}{Vi-I_{load}\cdot R_{hs}}. \tag{12}$$

In addition, the general expression of Ton obtained according to the volt-second balance principle of the buck converter is as follows.

$$\text{Ton}=\frac{Vo}{V_i-I_{load}\cdot R_{hs}}\times T_S. \tag{13}$$

Where $T_S$ is a switching period of the buck converter, and the formula (12) is transformed in the form of the formula (13) to obtain:

$$\text{Ton}=\frac{k\cdot Vo\cdot Rs1\cdot C1}{Vi-I_{load}\cdot R_{hs}}=\frac{Vo}{Vi-I_{load}\cdot R_{hs}}\times k\cdot Rs1\cdot C1. \tag{14}$$

The formulas (14) and (13) are compared to obtain $T_S$ in the embodiments of the present disclosure as:

$$T_S=k\cdot Rs1\cdot C1 \tag{15}$$

According to formula (15), it may be seen that $T_S$ in the embodiments of the present disclosure does not change with $I_{load}$. When the values of k, Rs1, and C1 are constant, $T_S$ is a constant, so that the operating frequency may be kept unchanged. It is to be noted that the constant operating frequency here is not absolutely constant, and may be considered constant relative to the changes in the background art, but in practice it may also be affected by the non-ideality of some inductors and other devices. The embodiments of the present disclosure mainly aim to eliminate the influence of the inversion delay time and the load current on Ton.

In addition, the determination of $R_S$ of the variable resistance unit 122 and the arrangement of the resistance in the variable resistance unit 122 are explained as follows: according to $R_S$·C1=Tcomp, it may be determined that $R_S$=Tcomp/C1, C1 is a constant, Tcomp may change with the change of Vi, and the larger Vi is, the smaller Tcomp is, and the larger $R_S$ is. $R_S$ may be obtained after Tcomp and C1 are determined. $R_S$ also changes with Vi, so that R1, R2, . . . , Rn may be set according to the change of $R_S$. An example is given for explanation. Assuming that there are 10 values of Vi, values of 10 Tcomps may be correspondingly obtained, and then values of 10 $R_S$s may also be calculated. Then, according to the 10 $R_S$s, the number of resistors in the variable resistance unit 122 and the value of each resistor may be set. For example, 10 resistors may be set, and the value of each resistor is set to the value of one of the $R_S$s. When the circuit operates, the switch corresponding to the resistor with the required value of $R_S$ is turned on, and the switches of other resistors are closed. Or it may also be set in a way that the value of each $R_S$ is equal to the sum of two or more resistors. The setting manner of the number and resistance values of the resistors in the variable resistance unit 122 are not limited in the embodiments of the present disclosure.

Figure 6:
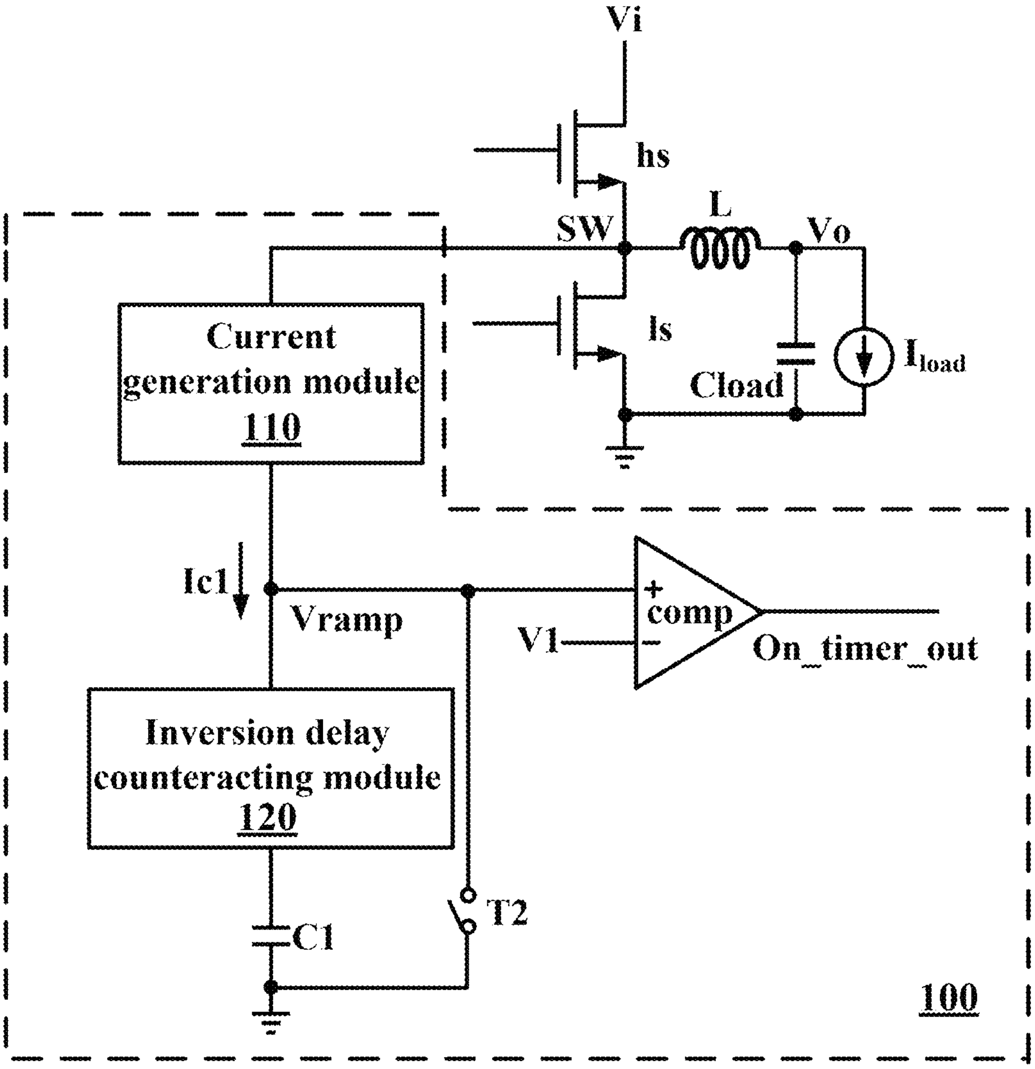
FIG. 6 shows a schematic circuit diagram of still another on-timing circuit according to an embodiment of the present disclosure.

Further, as shown in FIG. 6, the on-timing circuit 100 further includes a second switch T2. The second switch T2 is coupled between the ramp voltage node Vramp and the ground terminal, and the second switch T2 is disconnected after the first switch T1 is closed, and is closed after the first switch T1 is disconnected. Since the on-timing ends after the upper power transistor hs is turned off, the first switch T1 needs to be disconnected, and the second switch T2 needs to be closed.

The embodiments of the present disclosure further provide a buck converter with a quasi-fixed-frequency constant on-time architecture, including the on-timing circuit in the aforementioned embodiment. After an upper power transistor of the buck converter is turned on, the on-timing circuit starts timing, and after the on-timing circuit outputs a turn-off signal, the on-timing ends, and the buck converter turns off the upper power transistor according to the turn-off signal. In applications with a wide range of input voltages Vi and output voltages Vo, and different loads, the buck converter with the quasi-fixed-frequency constant on-time architecture in the embodiments of the present disclosure may also ensure a relatively small change in the system operating frequency, and better meet the requirements of peripheral applications.

In summary, the on-timing circuit in the embodiments of the present disclosure may achieve an effect of the operating frequency that changes very little with Vi, Vo, and $I_{load}$.

The flowcharts and block diagrams in the drawings illustrate the architecture, functionality, and operation of apparatus and method that may be realized according to various embodiments of the present disclosure. In this regard, each block in the flowchart or block diagram may represent a module, a program segment or a portion of an instruction, which includes one or more executable instructions for implementing the specified logic function. In some alternative implementations, the functions marked in the blocks may also occur in a different order from those marked in the drawings. For example, two blocks shown in succession may, in fact, be executed substantially in parallel, and sometimes in a reverse order, depending upon the functionality involved. It is also to be noted that each block in the block diagram and/or flowchart, and a combination of blocks in the block diagram and/or flowchart may be implemented by a special purpose hardware-based system which performs a specified function or operation, or a combination of special purpose hardware and computer instructions.

Unless otherwise indicated clearly in the context, the singular form of terms used herein and in the appended claims includes the plural, and vice versa. Therefore, when referring to the singular, it usually includes the plural of the corresponding term. Similarly, the words "include" and "comprise" will be interpreted as inclusive rather than exclusive. Similarly, the terms "include" and "or" shall be interpreted as including, unless such interpretation is expressly prohibited herein. Where the term "example" is used herein, particularly when it is behind a group of terms, the "example" is only exemplary and illustrative, and should not be considered exclusive or extensive.

Further aspects and scope of adaptability become apparent from the description provided herein. It is to be understood that various aspects of the present disclosure may be implemented separately or in combination with one or more other aspects. It is also to be understood that the description and specific embodiments herein are for illustrative purposes only and are not intended to limit the scope of the present disclosure.

Several embodiments of the present disclosure have been described in detail above. However, apparently, those skilled in the art can make various modifications and variants to the embodiments of the present disclosure without departing from the spirit and scope of the present disclosure. The scope of the present disclosure is limited by the appended claims.

What is claimed is:

1. An on-timing circuit, wherein the on-timing circuit is configured for a buck converter with a quasi-fixed-frequency constant on-time architecture, and allowed to output a turn-off signal for turning off an upper power transistor of the buck converter, wherein the on-timing circuit comprises a current generation module, an inversion delay counteracting module, a capacitor, and a comparator, wherein an input end of the current generation module is coupled to a switch node of the buck converter, an output end of the current generation module is coupled to a ramp voltage node, the upper power transistor in the buck converter and an inductor are coupled at the switch node, and the current generation module is configured to generate a charging current in direct proportion to a voltage of the switch node after the upper power transistor is turned on;

an input end of the inversion delay counteracting module is coupled to the ramp voltage node, an output end of the inversion delay counteracting module is coupled to a first end of the capacitor, the inversion delay counteracting module is configured to generate a first delay for counteracting an inversion delay of the comparator according to a variable resistance unit and the capacitor, and a resistance value of the variable resistance unit is controlled by an input voltage of the buck converter;

a second end of the capacitor is coupled to a ground terminal, and the capacitor is configured to be charged by the charging current after the upper power transistor is turned on; and a positive input end of the comparator is coupled to the ramp voltage node, a negative input end of the comparator is coupled to a first voltage, the comparator is configured to compare a ramp voltage corresponding to the ramp voltage node with the first voltage and generate the turn-off signal, and the first voltage is a reference voltage in proportion to an output voltage of the buck converter.

2. The on-timing circuit according to claim 1, wherein the current generation module comprises a first current generation module and a second current generation module, wherein the first current generation module is configured to generate a first current according to the voltage of the switch node and the ramp voltage of the ramp voltage node; and the second current generation module is configured to generate a second current according to the ramp voltage of the ramp voltage node, and a sum of the first current and the second current is the charging current.

3. The on-timing circuit according to claim 1, wherein the inversion delay counteracting module comprises a decoder unit and the variable resistance unit, wherein the decoder unit is configured to generate a switch control signal according to the input voltage; and the variable resistance unit is configured to adjust the resistance value of the variable resistance unit according to the switch control signal.

4. The on-timing circuit according to claim 2, wherein the first current generation module comprises a first resistor and a first switch, wherein a first end of the first resistor is coupled to the switch node, a second end of the first resistor is coupled to a first end of the first switch, and the second end of the first resistor generates the first current; and a second end of the first switch is coupled to the ramp voltage node, and the first switch is closed after the upper power transistor is turned on, and is disconnected after the upper power transistor is turned off.

5. The on-timing circuit according to claim 4, wherein the second current generation module comprises a first transistor, a second transistor, a third transistor, a fourth transistor, a fifth transistor, a sixth transistor, a first current source, and a second resistor, wherein the first transistor and the second transistor form a first current mirror, a source of the first transistor and a source of the second transistor are coupled to a power supply voltage, a gate of the first transistor and a gate of the second transistor are coupled to a drain of the first transistor, a drain of the second transistor is coupled to the ramp voltage node, and the drain of the second transistor generates the second current;

the third transistor and the fourth transistor form a second current mirror, a gate of the third transistor and a gate of the fourth transistor are coupled to a drain of the third transistor, the drain of the third transistor is coupled to a first end of the first current source, and a drain of the fourth transistor is coupled to the drain of the first transistor;

a source of the fifth transistor is coupled to a source of the third transistor, a gate of the fifth transistor is coupled to the ramp voltage node, and a drain of the fifth transistor is coupled to the ground terminal;

a source of the sixth transistor is coupled to a source of the fourth transistor, a gate of the sixth transistor is coupled to a drain of the sixth transistor, and the drain of the sixth transistor is coupled to a first end of the second resistor; and a second end of the second resistor is coupled to the ground terminal, and a second end of the first current source is coupled to the power supply voltage.

6. The on-timing circuit according to claim 3, wherein the variable resistance unit comprises n resistors and n switches, wherein the n resistors are sequentially connected in series, and both sides of each resistor of the n resistors are connected to one switch of the n switches in parallel.

7. The on-timing circuit according to claim 6, wherein the decoder unit comprises an n-bit decoder, and the switch control signal comprises n switch signals, wherein an input end of the n-bit decoder receives the input voltage, an output end of the n-bit decoder outputs the n switch signals, the n switch signals control an opening and closing of the n switches, and each switch of the n switches corresponds to one switch signal of the n switch signals.

8. The on-timing circuit according to claim 1, wherein the resistance value of the variable resistance unit is in inverse proportion to the input voltage.

9. The on-timing circuit according to claim 5, wherein a resistance value of the first resistor is equal to a resistance value of the second resistor.

10. The on-timing circuit according to claim 4, further comprising a second switch, wherein the second switch is coupled between the ramp voltage node and the ground terminal, and the second switch is disconnected after the first switch is closed, and is closed after the first switch is disconnected.

11. The on-timing circuit according to claim 5, wherein current mirror ratios of the first current mirror and the second current mirror are both 1.

12. A buck converter with a quasi-fixed-frequency constant on-time architecture, comprising the on-timing circuit according to claim 1.

* * * * *